United States Patent
Yasui et al.

(10) Patent No.: US 6,540,171 B2
(45) Date of Patent: Apr. 1, 2003

(54) THREAD WINDING APPARATUS

(75) Inventors: Yoshiharu Yasui, Kariya (JP); Masaaki Amano, Kariya (JP)

(73) Assignee: Kabushiki Kaisha Toyoda Jidoshokki Seisakusho, Kariya (JP)

(*) Notice: Subject to any disclaimer, the term of this patent is extended or adjusted under 35 U.S.C. 154(b) by 87 days.

(21) Appl. No.: 09/780,176

(22) Filed: Feb. 9, 2001

(65) Prior Publication Data

US 2001/0013563 A1 Aug. 16, 2001

(30) Foreign Application Priority Data

Feb. 10, 2000 (JP) ......................................... 2000-033851

(51) Int. Cl.[7] ............................................... B65H 81/06
(52) U.S. Cl. ...................................... 242/437; 242/444
(58) Field of Search ................................ 242/443, 444, 242/445, 445.1, 447.7, 447.3

(56) References Cited

U.S. PATENT DOCUMENTS

| | | | | |
|---|---|---|---|---|
| 2,319,413 A | * | 5/1943 | Leathers et al. | 242/431 |
| 2,645,429 A | * | 7/1953 | Scott et al. | 242/431 |
| 2,964,252 A | * | 12/1960 | Rosenberg | 242/447.3 |
| 3,010,667 A | * | 11/1961 | Forsberg | 140/71 R |
| 3,052,419 A | * | 9/1962 | Huck | 138/176 |
| 3,589,643 A | * | 6/1971 | Takizawa | 242/447.3 |
| 3,886,029 A | * | 5/1975 | Poulsen | 138/144 |
| 3,989,200 A | * | 11/1976 | Bachi | 242/118.4 |
| 4,359,356 A | | 11/1982 | Kornbichler et al. | 156/175 |
| 4,856,720 A | * | 8/1989 | Deregibus | 156/429 |
| 5,450,516 A | | 9/1995 | Pasquali et al. | 385/115 |
| 5,876,544 A | | 3/1999 | Yamamoto et al. | 156/171 |
| 5,897,729 A | * | 4/1999 | Bikson et al. | 156/172 |
| 6,050,518 A | * | 4/2000 | Ninet et al. | 242/436 |
| 6,098,913 A | * | 8/2000 | Demore | 242/437 |
| 6,192,958 B1 | * | 2/2001 | Yamamoto et al. | 156/430 |
| 6,390,406 B1 | * | 5/2002 | Wood | 242/418 |
| 2001/0028015 A1 | | 10/2001 | Yasui et al. | 242/487.6 |

FOREIGN PATENT DOCUMENTS

| | | | | |
|---|---|---|---|---|
| EP | 0 493 046 A1 | | 7/1992 | B65H/55/04 |
| JP | 204281 | * | 8/1990 | 242/447.3 |
| JP | 6-49549 | | 6/1994 | B65H/81/06 |
| JP | 11-262955 | | 9/1999 | B29C/70/16 |

* cited by examiner

*Primary Examiner*—Emmanuel Marcelo
(74) *Attorney, Agent, or Firm*—Morgan & Finnegan LLP

(57) ABSTRACT

An apparatus for winding a thread around a surface of an object while rotating the object. The apparatus includes a plurality of guide members. The guide members selectively guide a plurality of threads to the surface of the object. One guide member corresponds to one thread. The guide members move along the object. A moving device moves a selected one of the guide members.

9 Claims, 4 Drawing Sheets

THREAD WINDING APPARATUS

BACKGROUND OF THE INVENTION

The present invention relates to thread winding apparatuses for winding threads around objects.

Fiber reinforced plastic (FRP) is formed by reinforcing plastic with reinforced fiber material. The reinforced fiber material improves the heat resistance, strength, rigidity, and anti-crack properties of plastic. The FRP is thus provided with improved performance and is generally used for various objectives. Various methods are known for forming an FRP product. Particularly, a filament winding method is widely used in forming, for example, pressure tanks or pipes. The method maintains a reinforced fiber thread in an integral state without cutting the thread, thus maximizing the strength of the fiber thread.

FIG. 7 shows an example of an apparatus for forming an FRP product in accordance with such a filament winding method. A cylindrical mandrel 101 is rotationally supported by, for example, a frame (not shown). Linear guide members 102 and a ball screw 103 are adjacent to and parallel to the mandrel 101. A traverse 104 is secured to the linear guide members 102 and slides along the linear guide members 102. The traverse 104 includes a thread guide 105. A threaded hole 107 extends through the traverse 104 and engages the ball screw 103. When the ball screw 103 is rotated by a moving device (not shown), the traverse 104 slides along the linear guide members 102. A reinforced fiber thread 106 is passed through the thread guide 105 and wound on a surface of the mandrel 101 through the thread guide 105. A desired winding pattern is obtained by controlling the rotating speed of the mandrel 101 and the speed of the traverse 104.

The reinforced fiber thread 106 is formed of, for example, glass fiber, carbon fiber, or aramid fiber. The fiber is selected in accordance with the use and shape of an FRP product. A single product may include a reinforced fiber thread 106 formed of one material. Alternatively, the product may include a plurality of reinforced fiber threads 106 formed of different materials. For example, FRP forming a compressed-natural-gas tank includes glass fiber and carbon fiber. That is, an outer fiber layer is formed by the glass fiber, and an inner fiber layer is formed by the carbon fiber. If the tank is dropped, for example, the glass fiber in the outer layer, which is relatively fragile, is fractured to absorb the shock. However, the carbon fiber in the inner layer, which is relatively hard, prevents the tank from being ruptured. The contents of the tank therefore does not escape.

However, to form an FRP product including a plurality of reinforced fiber threads 106 formed of different materials, the operation of the thread winding apparatus must be discontinued for switching the reinforced fiber threads 106. That is, when winding of one reinforced fiber thread 106 is completed, the thread 106 must be removed from the thread guide 105. Subsequently, another reinforced fiber thread 106 of a different material is passed through the thread guide 105 before being wound around the mandrel 101. This lowers efficiency and increases costs.

SUMMARY OF THE INVENTION

Accordingly, it is an objective of the present invention to provide a thread winding apparatus with an improved operational efficiency that quickly replaces a reinforced fiber thread when forming an FRP product using a plurality of reinforced fiber threads of different materials.

To achieve the above objective, the present invention is a thread winding apparatus for winding a thread around an object while rotating the object. The apparatus includes a plurality of guide members for selectively guiding a plurality of threads to a surface of the object. One guide member corresponds to one thread, and the guide members move along the object. A moving device moves the guide members.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A first embodiment of the present invention will now be described with reference to FIGS. 1 to 3. The embodiment will be explained in accordance with the filament winding method for forming a cylindrical FRP product.

Figure 1:
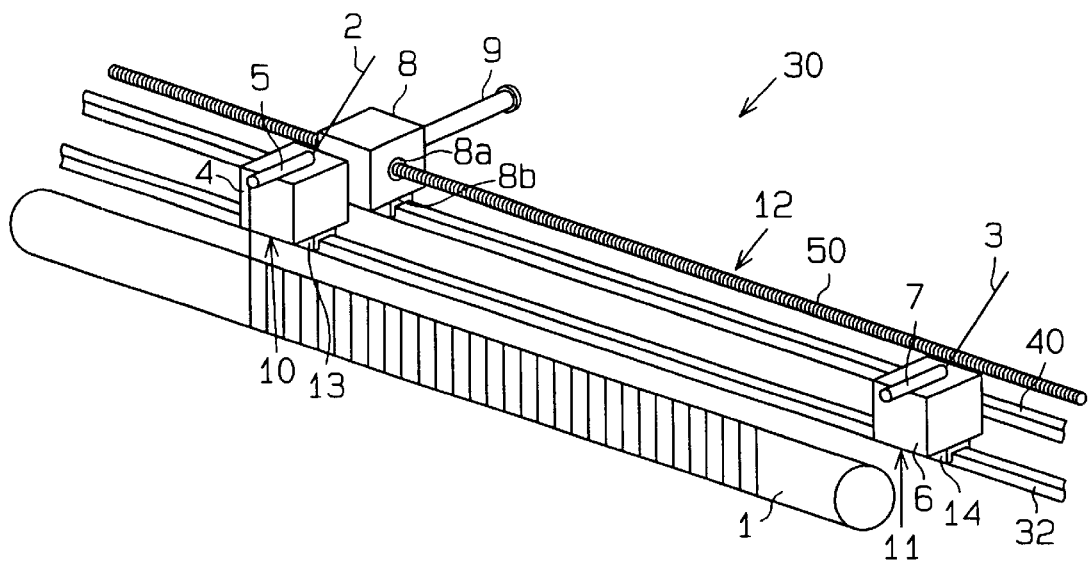
FIG. 1 is a perspective view showing a first embodiment of a thread winding apparatus according to the present invention in a certain operational state.

As shown in FIG. 1, a thread winding apparatus 30 includes a cylindrical mandrel 1 around which a thread is wound. The mandrel 1 is rotationally supported by a support mechanism (not shown). A rotating device (not shown) rotates the mandrel 1 around the axis of the mandrel 1. First and second guide members 10, 11 guide first and second reinforced fiber threads 2, 3, respectively, to a corresponding winding position on a surface of the mandrel 1. A moving device 12 moves the guide members 10, 11.

The first reinforced fiber thread 2 is formed by immersing carbon fiber in resin, and the second reinforced fiber thread 3 is also formed by immersing glass fiber in resin. The first guide member 10 includes a tubular guide 5 and a support 4, which supports the tubular guide 5. The reinforced fiber thread 2 is passed through the guide 5. A substantially U-shaped holder 13 is located below the support 4. In the same manner, the second guide member 11 includes a tubular guide 7 and a support 6, which supports the tubular guide 7. The reinforced fiber thread 3 is passed through the guide 7. A substantially U-shaped holder 14 is located below the support 6. A front guide rail 32 is parallel to the axis of the mandrel 1. The guide members 10, 11 are supported by the associated holders 13, 14 and slide along the front guide rail 32 through the holders 13, 14.

The moving device 12 includes a ball screw 50 and a movable body 8. The ball screw 50 is parallel to the front guide rail 32. A matching threaded hole 8a extends through the movable body 8 and engages the ball screw 50. The engagement between the threaded hole 8a and the ball screw 50 moves the body 8, when the ball screw 50 is rotated. A substantially U-shaped holder 8b is located below the movable body 8. A rear guide rail 40 is parallel to the guide rail 32. The movable body 8 is supported by the holder 8b to slide along the rear guide rail 40 through the holder 8b. The movable body 8 includes a cylinder 9, which functions as a connecting mechanism. The cylinder 9 accommodates a piston 9a that projects toward the guide members 10, 11.

Figure 3:
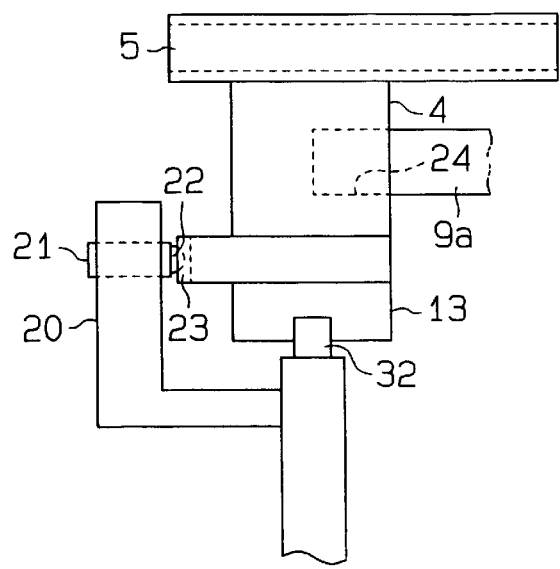
FIG. 3 is an enlarged, cross-sectional view showing a portion of the thread winding apparatus of FIG. 1.

As shown in FIG. 3, the first guide member 10 has a recess 24 formed in a side of the support 4 that faces toward the movable body 8. The piston 9a, which projects from the cylinder 9, is received in the recess 24. In the same manner, the second guide member 11 has a recess 24 formed in a side of the support 6 that faces toward the movable body 8 for receiving the piston projecting from the cylinder 9.

A movement range and a pair of waiting positions for the guide members 10, 11 are located along the front guide rail 32. The waiting positions are located at opposite ends of the front guide rail 32, respectively and are excluded from the movement range. The guide members 10, 11 move within the movement range of the front guide rail 32 for guiding the associated reinforced fiber threads 2, 3 to corresponding winding positions on the surface of the mandrel 1. As shown in FIG. 3, a ball plunger 21 is provided at each waiting position of the guide rail 32 and is supported by an arm 20. Each ball plunger 21 includes a ball 22 that faces a corresponding one of the guide members 10, 11.

As shown in FIG. 3, the first guide member 10 has a recess 23 formed in a side of the support 4 that is opposite to the side in which recess 24 is formed. The ball 22 of the ball plunger 21 engages the recess 23. In the same manner, the second guide member 11 has a recess 23 formed in a side of the support 6 that is opposite to the side in which the recess 24 is formed. The ball 22 of the ball plunger 21 engages the recess 23.

The operation of the thread winding apparatus 30 will hereafter be described by way of an example. In this example, the reinforced fiber thread 2 is first wound around the mandrel 1 to form a lower layer. The reinforced fiber thread 3 is then wound around the lower layer of the thread 2 to form an upper layer.

First, one of the guide members 10, 11 is placed at one waiting position of the front guide rail 32, while the other of guide members 11, 10 is placed at the other waiting position of the front guide rail 32. The ball 22 of each ball plunger 21 is engaged with the recess 23 of the corresponding guide member 10, 11. The guide members 10, 11 are thus held at the waiting positions. Next, winding of the reinforced fiber thread 2 around the mandrel 1 is prepared. That is, the ball screw 50 is rotated to move the movable body 8 to a position corresponding to the first guide member 10 guiding the first reinforced fiber thread 2. In other words, the movable body 8 is positioned such that the piston accommodated in the cylinder 9 faces the recess 24 formed in the support 4 of the first guide member 10. The piston 9a is then projected from the cylinder 9 to engage the recess 24. This connects the movable body 8 to the support 4 of the first guide member 10.

Subsequently, the ball screw 50 is rotated again to move the first guide member 10 to a desired winding position, as shown in FIG. 1. More specifically, when the ball screw 50 starts to move the first guide member 10, the ball 22 is disengaged from the recess 23 of the first guide member 10, regardless of the urging force of the ball 22. The first guide member 10 is thus readily released from the waiting position. The winding of the reinforced fiber thread 2 is then initiated.

When the winding of the reinforced fiber thread 2 is completed, the first guide member 10 is returned to the original waiting position. The associated ball plunger 21 holds the first guide member 10 at the waiting position. The piston is then retracted from the recess 24 of the first guide member 10 to release the movable body 8 from the first guide member 10.

Next, winding of the reinforced fiber thread 3 around the mandrel 1 is prepared. That is, the ball screw 50 is rotated to move the movable body 8 to a position corresponding to the second guide member 11 guiding the second reinforced fiber thread 3. In other words, the movable body 8 is positioned such that the piston 9a accommodated in the cylinder 9 faces the recess 24 formed in the support 6 of the second guide member 11. The piston is then projected from the cylinder 9 to engage the recess 24. This connects the movable body 8 to the support 6 of the second guide member 11.

Figure 2:
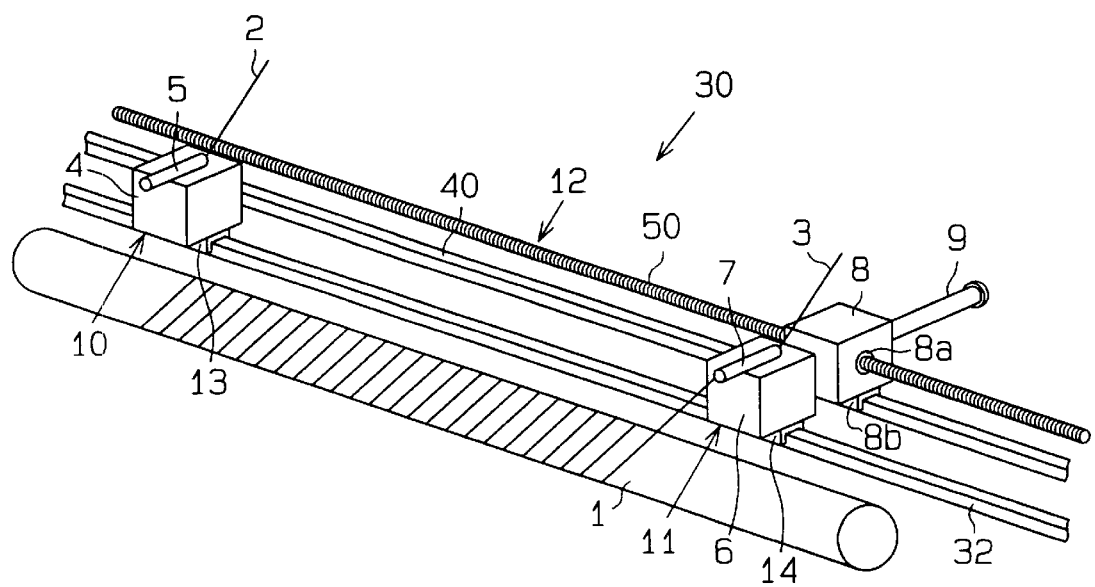
FIG. 2 is a perspective view showing the thread winding apparatus of FIG. 1 in another operational state.

Subsequently, the ball screw 50 is rotated again to move the second guide member 11 to a desired winding position, as shown in FIG. 2. More specifically, when the ball screw 50 starts to move the second guide member 11, the ball 22 is disengaged from the recess 23 of the second guide member 11, regardless of the urging force of the ball 22. The second guide member 11 is thus readily released from the waiting position, like the first guide member 10. The winding of the reinforced fiber thread 3 is then initiated.

When the winding of the reinforced fiber thread 3 is completed, the second guide member 11 is returned to the original waiting position. The associated ball plunger 21 holds the second guide member 11 at the waiting position. The piston is then retracted from the recess 24 of the second guide member 11 to release the movable body 8 from the second guide member 11. The winding of the reinforced fiber threads 2, 3 is thus completed.

As described, in the first embodiment, the guide members 10, 11 are provided separately for guiding the associated reinforced fiber threads 2, 3. Each guide member 10, 11 is thus moved independently to a corresponding winding position of the mandrel 1 when guiding the associated reinforced fiber thread 2, 3. Thus, when completing the winding of the reinforced fiber thread 2, the thread 2 need not be removed from the guide member before starting the winding of the reinforced fiber thread 3. That is, the first guide member 10 is simply returned to its original waiting position together with the reinforced fiber thread 2, and the second guide member 11 guiding the reinforced fiber thread 3 is moved to a corresponding winding position for initiating the winding of the reinforced fiber thread 3. The winding of the reinforced fiber thread 2 is thus easily switched to the winding of the reinforced fiber thread 3. This maintains the operational efficiency at a constant level.

When one reinforced fiber thread 2 (3) is wound around the mandrel 1, the guide member 11 (10) associated with the other reinforced fiber thread 3 (2) is securely held at a corresponding waiting position by the ball plunger 21. This prevents the guide member 11 (10) from being erroneously separated from the waiting position. The guide member 11 (10) thus does not interfere with the other guide member (11) guiding the reinforced fiber thread 2 (3), which is wound around the mandrel 1.

A second embodiment of the present invention will hereafter be described with reference to FIGS. 4 to 6. Same or like reference numerals are given to parts of the second embodiment that are the same as or like corresponding parts of the first embodiment. The description of these parts are omitted.

Figure 4:
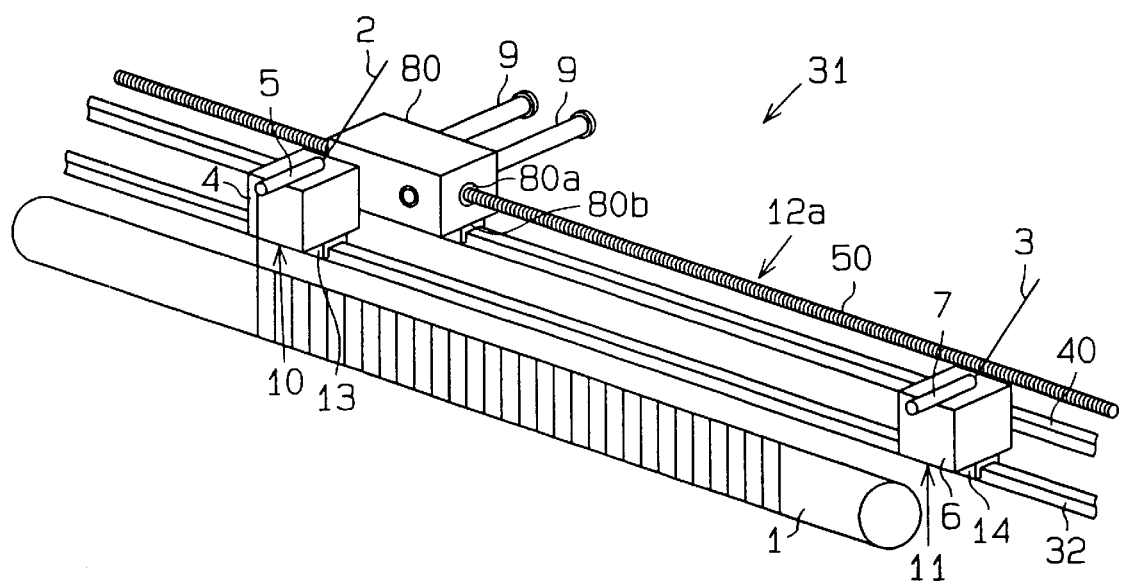
FIG. 4 is a perspective view showing a second embodiment of a thread winding apparatus according to the present invention in a certain operational state.

As shown in FIG. 4, a thread winding apparatus 31 of the second embodiment is different from the thread winding apparatus 30 of the first embodiment in that a movable body 80 of a moving device 12a has a pair of parallel cylinders 9. The remaining configuration of the second embodiment is identical to that of the first embodiment. More specifically, the moving device 80 has a threaded hole 80a matching the ball screw 50 and is held by a holder 80b with respect to the guide rail 40. The cylinders 9 are spaced from each other by a predetermined interval. The interval is selected such that a piston projecting from each cylinder 9 engages with the recess 24 of the corresponding guide member 10, 11 when the guide members 10, 11 contact each other.

The operation of the thread winding apparatus 31 will now be described by way of an example. In this example, the first reinforced fiber thread 2 is first wound around the mandrel 1 to form a lower layer. The second reinforced fiber thread 3 is then wound around the lower layer of the reinforced fiber thread 2 to form an intermediate layer. Subsequently, a combination of the reinforced fiber threads 2, 3 is wound around the intermediate layer of the reinforced fiber thread 3 to form an upper layer.

First, one of the first and second guide members 10, 11 is placed at one waiting position of the front guide rail 32. The other of the first and second guide members 11, 10 is placed at the other waiting position. Each guide member 10, 11 is held at the corresponding waiting position by the ball 22 of the associated ball plunger 21 engaging with the recess 23. Next, winding of the first reinforced fiber thread 2 around the mandrel 1 is prepared. That is, the ball screw 50 is rotated to move the movable body 80 to a position corresponding to the first guide member 10 guiding the first reinforced fiber thread 2. In other words, the movable body 80 is positioned such that the piston 9a accommodated in one cylinder 9 (in this embodiment, the cylinder 9 located to the left as viewed in FIG. 4) faces the recess 24 formed in the support 4 of the guide member 10. The piston is then projected from the cylinder 9 to engage the recess 24. This connects the movable body 80 to the support 4 of the first guide member 10.

Subsequently, the ball screw 50 is rotated again to move the guide member 10 to a desired winding position, as shown in FIG. 4. More specifically, when the ball screw 50 starts to move the guide member 10, the ball 22 is disengaged from the recess 23 of the guide member 10, regardless of the urging force of the ball 22. The guide member 10 is thus readily released from the waiting position. The winding of the reinforced fiber thread 2 is then initiated.

When the winding of the reinforced fiber thread 2 is completed, the guide member 10 is returned to its original waiting position. The associated ball plunger 21 holds the guide member 10 at the waiting position. The piston is then retracted from the recess 24 of the guide member 10 to release the movable body 80 from the guide member 10.

Next, winding of the second reinforced fiber thread 3 around the mandrel 1 is prepared. That is, the ball screw 50 is rotated to move the movable body 80 to a position corresponding to the second guide member 11 guiding the reinforced fiber thread 3. In other words, the movable body 80 is positioned such that the piston 9a accommodated in the other cylinder 9 (in this embodiment, the cylinder 9 to the right as viewed in FIG. 5) faces the recess 24 formed in the support 6 of the second guide member 11. The piston is then projected from the cylinder 9 to engage with the recess 24. This connects the movable body 80 to the support 6 of the guide member 11.

Figure 5:
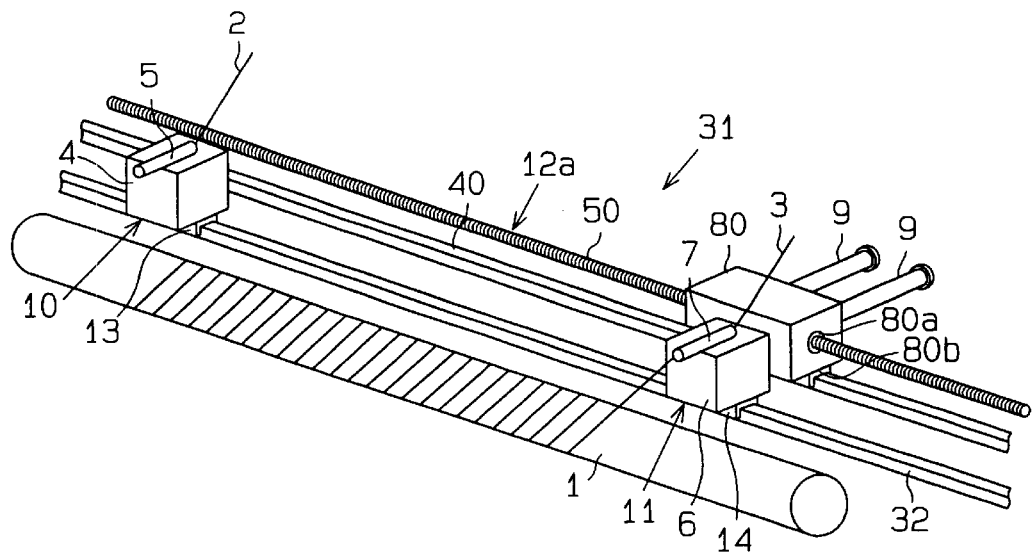
FIG. 5 is a perspective view showing the thread winding apparatus of FIG. 4 in another operational state.

Subsequently, the ball screw 50 is rotated again to move the second guide member 11 to a desired winding position, as shown in FIG. 5. More specifically, when the ball screw 50 starts to move the second guide member 11, the ball 22 is disengaged from the recess 23 of the second guide member 11, regardless of the urging force of the ball 22. The second guide member 11 is thus readily released from the waiting position, like the guide member 10. The winding of the reinforced fiber thread 3 is then initiated.

When the winding of the second reinforced fiber thread 3 is completed, the movable body 80 and the second guide member 11, which are connected to each other, are moved integrally to a position corresponding to the guide member 10 located at its original waiting position. In other words, the movable body 80 and the second guide member 11 are positioned such that the piston of the remaining cylinder 9 (the cylinder 9 to the left as viewed in FIG. 5) faces the recess 24 of the first guide member 10. The piston 9a is then projected from the cylinder 9 to engage with the recess 24, thus connecting the first guide member 10 to the movable body 80. In this state, both guide members 10, 11 are connected to the movable body 80.

Figure 6:
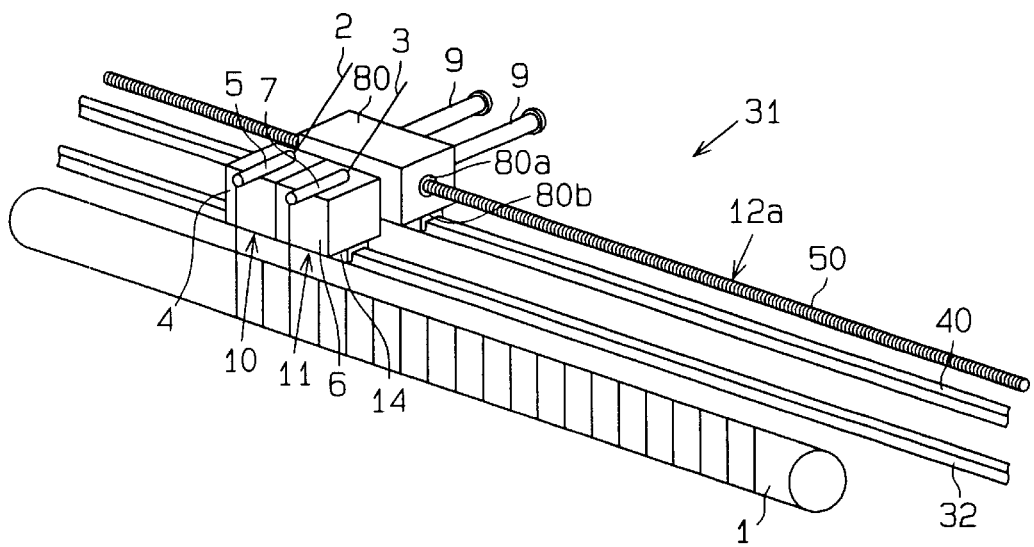
FIG. 6 is a perspective view showing the thread winding apparatus of FIG. 4 in another operational state.
Figure 7:
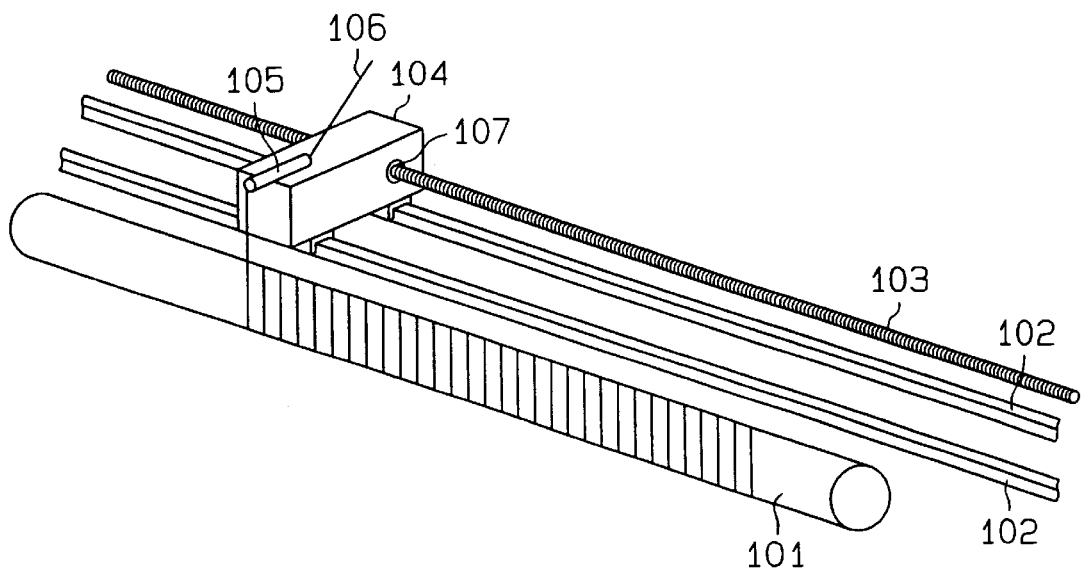
FIG. 7 is a perspective view showing a prior art thread winding apparatus.

The ball screw 50 is then rotated again to move the guide members 10, 11 to a desired position, as shown in FIG. 6. More specifically, when the ball screw 50 starts to move the guide members 10, 11, the ball 22 is disengaged from the recess 23 of the first guide member 10, regardless of the urging force of the ball 22. The first guide member 10 is thus readily released from the waiting position. The winding of the combined reinforced fiber threads 2, 3 is then initiated.

When the winding of the combined reinforced fiber threads 2, 3 is completed, each guide member 10, 11 is returned to the original waiting position. The ball plunger 21 holds the associated guide member 10, 11 at the corresponding waiting position. More specifically, when each guide member 10, 11 is returned to its original position, the piston is retracted from the recess 24 of the guide member 10, 11 to release the guide member 10, 11 from the movable body 80. The winding of the reinforced fiber threads 2, 3 is thus completed.

As described, in the second embodiment, the guide members 10, 11 are provided separately for guiding the associated reinforced fiber threads 2, 3, like the first embodiment. Each guide member 10, 11 is thus moved independently to a corresponding winding position when guiding the associated reinforced fiber thread 2, 3. Further, the guide members 10, 11 are moved integrally to a corresponding winding position when guiding the combined reinforced fiber threads 2, 3. Accordingly, when the winding of the first reinforced fiber thread 2 is completed, the first guide member 10 is simply returned to its original waiting position together with the reinforced fiber thread 2. The second guide member 11 guiding the second reinforced fiber thread 3 is then moved to a corresponding winding position to initiate the winding of the second reinforced fiber thread 3. The winding of the first reinforced fiber thread 2 is thus easily switched to the winding of the second reinforced fiber thread 3. In the same manner, when switching the winding of the second reinforced fiber thread 3 to the winding of the combined reinforced fiber threads 2, 3, the movable body 80 and the guide member 11, which are connected to each other, are moved integrally to a position corresponding to the first guide member 10 for connecting the first guide member 10 to the movable body 80. The winding of the second reinforced fiber thread 3 is thus readily switched to the winding of the combined reinforced fiber threads 2, 3. As a result, the operational efficiency of the thread winding apparatus 31 is maintained at a constant level.

When one reinforced fiber thread 2 (3) is wound around the mandrel 1, the guide member 11 (10) associated with the other reinforced fiber thread 3 (2) is securely held at the corresponding waiting position by the ball plunger 21. This prevents the guide member 11 (10) from being erroneously separated from the waiting position. The one guide member 11 (10) thus does not interfere with the other guide member 10 (11) guiding the associated reinforced fiber thread 2 (3), which is wound around the mandrel 1. Further, the thread winding apparatus 31 of the second embodiment is applicable to both winding of a single reinforced fiber thread and winding of a combination of a plurality of reinforced fiber threads.

The present invention is not restricted to the above embodiments but may be modified as follows.

In the illustrated embodiment, the thread winding apparatus is applied to the filament winding method for forming an FRP product. However, the present invention may be applied to other methods for forming an FRP product.

The shape of the mandrel is not restricted to a cylindrical shape but may be other shapes. For example, the mandrel may have a rod-like shape, spherical shape, and a spindle-like shape, as long as the mandrel is rotated to wind a thread around the mandrel.

The material of the reinforced fiber thread is not restricted to glass fiber or carbon fiber. That is, the reinforced fiber thread may be formed of aramid fiber or boron fiber. Further, the fiber forming the reinforced fiber thread does not necessarily have to be immersed in resin.

The thread is not restricted to the reinforced fiber thread but may be a normal fiber thread or a metal wire.

Although the winding apparatus of each illustrated embodiment is applied to winding of the thread, the apparatus may be applied to winding of other objects such as a belt, as long as the objects are capable of being wound.

The moving device for moving the guide members need not employ the ball screw. For example, the moving device may be formed by a combination of a rack and a pinion or a linear motor. The ball screw, which is employed in each illustrated embodiment, tends to cause a deflection if the length of the ball screw is increased. In this case, the ball screw need be replaced by the rack and the pinion.

The shape of the guide rails, which guide the guide members and the movable body, is not restricted to that of the illustrated embodiments. The guide rails may be shaped in various manners as long as they are capable of guiding the guide members and the movable body. The holders, which hold the guide members and the movable body with respect to the associated guide rails, are shaped to match the guide rails.

The mechanism for guiding the guide members and the movable body need not be the guide rails. For example, the guide members and the movable body may be guided by shafts extending through a guide hole.

In the illustrated embodiments, the guide members include the cylinders. However, the cylinders may be replaced by rings or a concave members. Alternatively, a hole may be formed in the support of each guide member.

In each illustrated embodiment, the mandrel, the guide members, and the moving device are located along one plane. However, the guide members and the moving device may be located above the mandrel.

The connecting mechanism between the guide members and the movable body is not restricted to the piston. Instead, the guide members may be connected to the movable body by a hook or the like.

In the illustrated embodiments, the cylinder used in the connecting mechanism is supported by the movable body. However, the cylinder may be supported by the guide members. In this case, the recess engaging with the piston is formed in the movable body.

In the illustrated embodiments, each guide member is connected to the movable body by one cylinder. However, the guide member may be connected to the movable body by a plurality of cylinders.

In the illustrated embodiments, two guide members are provided. However, three or more guide members may be provided in the thread winding apparatus. In this case, three or more threads may be wound around the mandrel successively.

The movable body of the first embodiment includes one cylinder for connecting each guide member to the movable body. The movable body of the second embodiment includes two cylinders for connecting the guide members to the movable body. However, three or more cylinders may be supported by the movable body for connecting the guide members to the movable body. In this case, the number of the guide members must be increased to match the number of the cylinders. This structure enables a combination of three or more threads to be wound by the apparatus.

One guide member may support a plurality of threads. In this case, the threads are wound around the mandrel by moving the single guide member.

The extending direction of the guide rails for guiding the guide members and the movable body (the moving direction of the guide members) do not necessarily have to be parallel with the axis of the mandrel. That is, for example, the extending direction of the guide rails (the moving direction of the guide members) may be perpendicular to the axis of the mandrel, as long as a thread is wound around the mandrel.

Although the apparatus of each illustrated embodiment has a single movable body, a plurality of movable bodies may be provided. For example, the number of the movable bodies may be equal to the number of the guide members. In this case, after one guide member is returned to its original waiting position, the associated movable body need not be disconnected from the guide member. It is also necessary to match the number of the mechanisms for holding the guide members at corresponding waiting positions to the number of the guide members.

Each guide member may be formed integrally with a movable body. In this case, the mechanism for connecting the guide member to the movable body is unnecessary. Alternatively, each guide member may be provided with a moving device. In this case, the moving device directly moves the associated guide member.

As long as the guide members are securely held at the waiting positions without being separated from these positions, the mechanisms for holding the guide members at the waiting positions may be omitted.

The mechanism for holding each guide member at a corresponding waiting position is not restricted to a mechanism including a ball plunger. The mechanism may include other engaging structures such as a cylinder accommodating a piston.

Although the ball plungers of the illustrated embodiments are supported by the guide rails, the ball plungers may be supported by the guide members. In this case, the recesses engaging with the balls of the ball plungers are formed in the guide rails.

The waiting positions for the guide members are not restricted to the opposite ends of the guide rail guiding the guide members. For example, a waiting position for all guide members may be provided at one end of the guide rail.

In the second embodiment, the lower layer and the intermediate layer are each formed by a single thread. The thread of the lower layer is formed of a material different from that of the thread forming the intermediate later. The upper layer is formed by the combination of these threads. However, the layer configuration is not restricted to the second embodiment but may be modified as necessary. For example, the lower layer may be formed by the combination of the two threads. In this case, the intermediate layer is formed by one thread forming the combination, and the upper layer is formed by the other thread. Alternatively, the lower layer and the intermediate layer may be both formed by the combination of the two threads, and the upper layer is formed by one thread forming the combination. Further, the layer configuration may include four or more layers. In addition, four or more reinforced fiber threads of different materials may be wound around the mandrel. In this case, the number of the guide members need to be increased to match the number of the reinforced fiber threads. This structure enlarges a range from which a single thread or a combination of a plurality of threads are selected.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A thread winding apparatus for winding a thread around an object while rotating the object, the apparatus comprising:
    a plurality of guide members for selectively guiding a plurality of threads to a surface of the object, respectively, the guide members moving along the object; and
    a moving device for moving the guide members, wherein, when switching winding of one thread to subsequent winding of another thread, the moving device selectively moves the guide member that guides the thread corresponding to the subsequent winding.

2. The thread winding apparatus as set forth in claim 1, wherein the moving device selectively moves one or more guide members.

3. The thread winding apparatus as set forth in claim 1, wherein the moving device includes a connecting mechanism for releasably connecting only one of the guide members that corresponds to a desired thread to the moving device.

4. The thread winding apparatus as set forth in claim 3 wherein the connecting mechanism connects a plurality of guide members to the moving device at one time.

5. The thread winding apparatus as set forth in claim 3 further comprising a guide rail that is parallel to the rotational axis of the object, wherein:
    the guide member includes a support moving along the guide rail and a thread guide secured to the support, wherein a thread is passed through the thread guide;
    the moving device includes a ball screw that is parallel to the guide rail, a movable body having a threaded hole engaging the ball screw such that the movable body is moved by rotation of the ball screw, and a cylinder secured to the movable body for forming the connecting mechanism, wherein the cylinder accommodates a piston; and
    the piston projects from the cylinder of the moving device to engage with a recess, which is formed in each guide member, for connecting the movable body to the one guide member.

6. The thread winding apparatus as set forth in claim 5, wherein the movable body includes a plurality of cylinders, and a plurality of the guide members are engaged with the movable body at one time through pistons projecting from the cylinders of the movable body, respectively.

7. The thread winding apparatus as set forth in claim 1, wherein the moving device moves one of the guide members to a waiting position such that the one guide member does not interfere with another of the guide members, which guides a selected thread.

8. The thread winding apparatus as set forth in claim 7, further comprising a holding mechanism for holding the one guide member at the waiting position and releasing the one guide member from the waiting position.

9. The thread winding apparatus as set forth in claim 8, wherein the holding mechanism includes:
    an arm located at the waiting position;
    a recess formed in the arm or the guide member; and
    a ball plunger provided in the other of the arm and the guide member for engaging with the recess.

* * * * *